Figure 1:
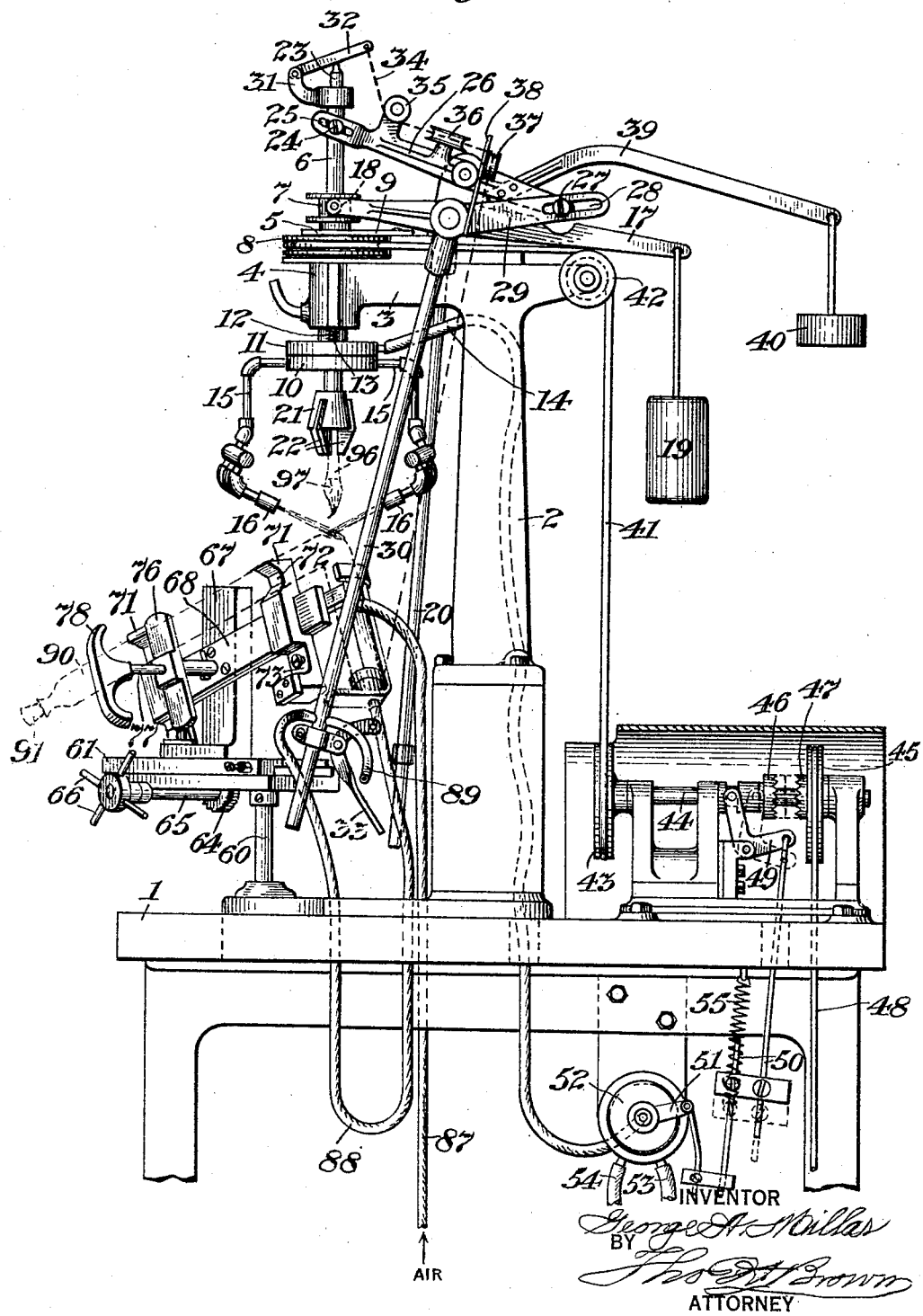

Feb. 14, 1933.   G. A. MILLAR   1,897,488
GLASS WORKING MACHINERY
Filed Dec. 27, 1928   3 Sheets-Sheet 1

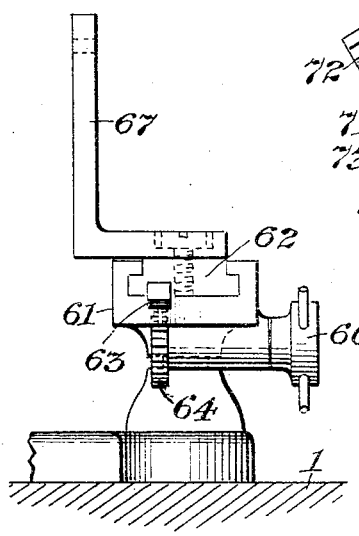
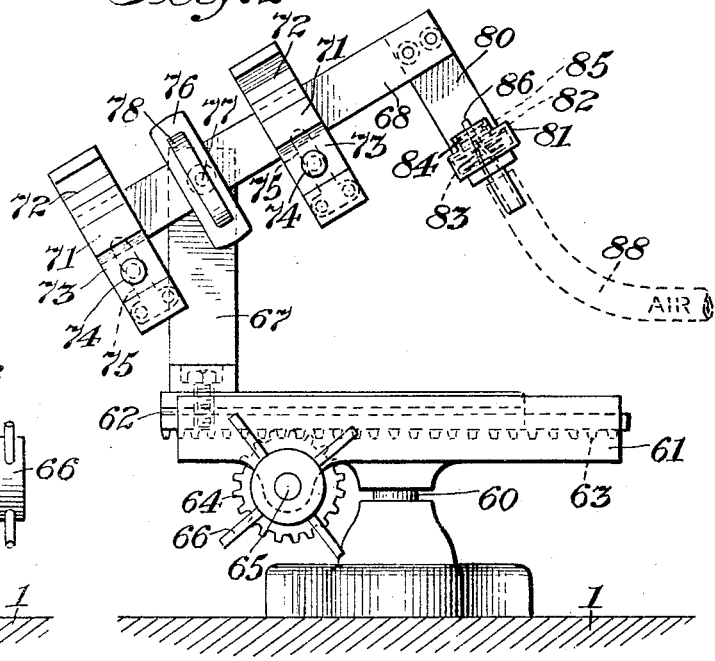
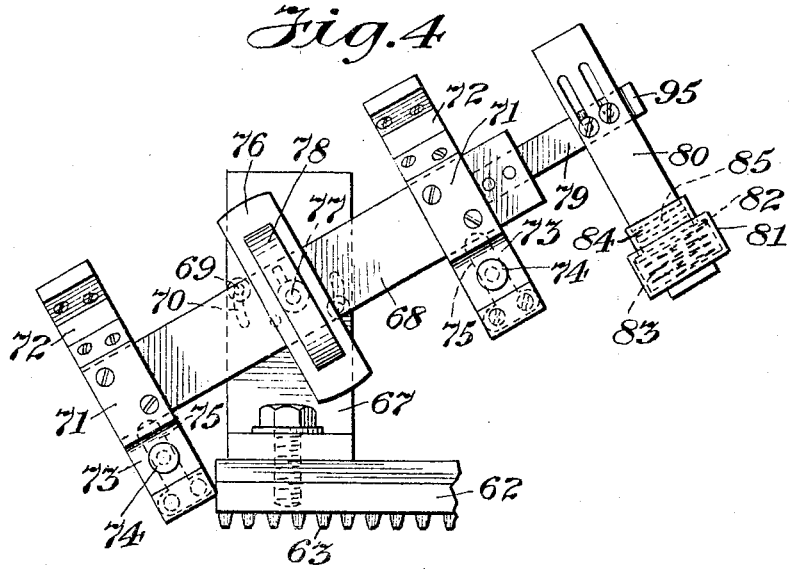

Feb. 14, 1933. G. A. MILLAR 1,897,488
GLASS WORKING MACHINERY
Filed Dec. 27, 1928 3 Sheets-Sheet 3
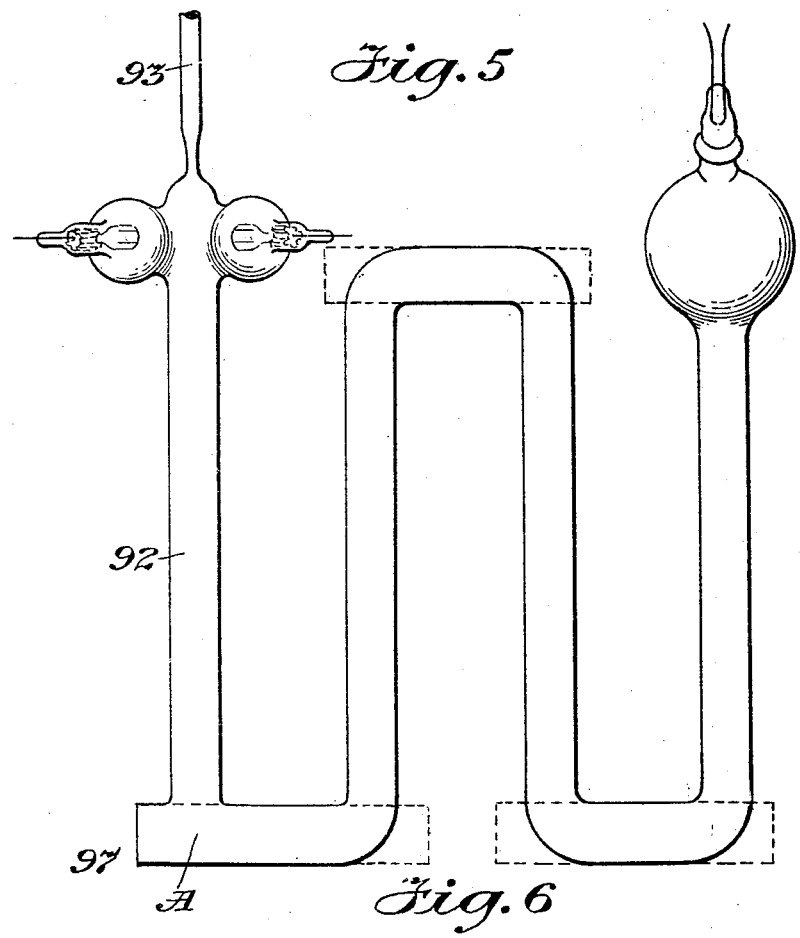
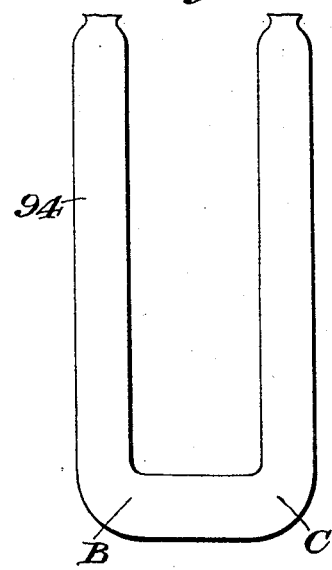
INVENTOR
George A. Millar
BY
Thos. D. Brown
ATTORNEY Patented Feb. 14, 1933

1,897,488

UNITED STATES PATENT OFFICE

GEORGE A. MILLAR, OF RIDGEFIELD PARK, NEW JERSEY, ASSIGNOR TO GENERAL ELECTRIC VAPOR LAMP COMPANY, OF HOBOKEN, NEW JERSEY, A CORPORATION OF NEW JERSEY

GLASS-WORKING MACHINERY

Application filed December 27, 1928. Serial No. 328,686.

The present invention relates to machinery for working glass. The particular object of the invention is to provide a machine for producing a smooth bend at the junction of two pieces of glass tubing which have been previously fused together at an angle. Other objects and advantages of the invention will appear from the following particular description of one form of machine embodying the invention or from an inspection of the accompanying drawings.

The invention consists of certain new and novel features of construction and combinations of parts hereinafter set forth and claimed.

In the manufacture of tubular lamps or other tubular devices having curves or bends therein considerable difficulty has been encountered in the forming of these bends. Heretofore it has been necessary to employ glass workers specially trained for this particular work to perform the operation, which was not only slow and expensive, but unsatisfactory in its results, since undesirable variations in the finished product could not be avoided. The method employed has been to seal the end of one section of tubing into the sidewall of another section of tubing near the end thereof and at the desired angle, after which the protruding end was pulled off, thereby forming the desired bend in the tubing. Both of these operations were, of course, accompanied by working of the glass by variation of the internal air pressure, etc. in a manner well known in the glass working art to maintain the desired shape and cross section of the tubing. By the present invention a machine has been provided which will perform the latter of these operations much more rapidly than could be done by hand at considerably less expense of time and working materials, and this is accomplished by an operator relatively unskilled in the glass working art.

In the accompanying drawings there is shown by way of illustration one form of apparatus for carrying out my invention, in which Fig. 1 is a side elevation of a machine for finishing the bends of M and U shaped mercury arc lamps, Fig. 2 is a front view of the tube supporting means used in this machine, designed to hold tubing of certain configurations, Fig. 3 is a side view of a portion of the support shown in Fig. 2, Fig. 4 shows a modification of a portion of the supporting structure of Fig. 2, but designed to support tubing of different configuration.

Fig. 5 shows an M-shaped tubular lamp of the Cooper Hewitt type with one bend ready to be finished by this machine, the other bends having been previously finished in the same manner, as indicated by the dotted lines, and Fig. 6 shows two bends which have been finished by this machine to form a U-shaped tube.

In the drawings the table 1 supports the standard 2 having the forward projecting arm 3. At its forward end said arm 3 terminates in a boss 4 in which is slidably and rotatably mounted the vertical hollow cylinder 5 in which in turn is slidably mounted the hollow shaft or spindle 6. At the upper end of cylinder 5 is mounted and annularly grooved double flange member 7. Slidably mounted on said cylinder 5 between said flange 7 and boss 4 is a pulley 8 which drives said cylinder 5 through a sliding key and keyway arrangement not shown but well known in the art. The member 9 fixed to the top of said arm 3 and projecting over said pulley 8 serves with the upper end of the boss 4 to limit the movement of said pulley vertically. At the lower end of said cylinder 5 is concentrically mounted the flange 10. About said cylinder 5 between said boss 4 and said flange 10 is loosely mounted the annular member 11, which is kept from rotation by pins 12 which are set in the upper surface thereof, the other end of said pins sliding in suitable openings in the lower side of the boss 4. Compression springs 13 mounted on each of said pins 12 and pressing against the boss 4 and the annular member 11 serve to keep said member 11 in close contact with the flange 10. The member 10 has an annular groove in its lower face which registers with a similar groove in the upper face of flange 10, said grooves not being shown. A flexible tube 14 connects the upper groove to a suitable source of gas and air which will be more fully described later, while pipes 15 which connect with the groove in flange 10 at opposite sides of said flange at their other end carry the burner members 16. In this manner uninterrupted flow of the gas to the burners at all rotational positions is provided. The burner members 16 are adjusted to direct the flame therefrom somewhat downwardly and toward the axis of said cylinder 5.

Pivotally supported near its midpoint by the arm 3 is a lever 17 which at its forward end is forked to extend on either side of the grooved flange 7, the sides of said flange being engaged by rollers 18 carried by the forked portion of said lever 17. At the opposite end said lever 17 carries the counter balance 19. Said lever 17 is connected at its pivot to the lever 20 which serves as a handle for raising and lowering the end of said arm 17 and thereby for raising and lowering the burners 16.

The hollow spindle 6 at its lower end carries a chuck 21 in the form of a conical frustrum in which are guides for the chuck jaws 22, whereby said jaws spread apart when pushed in a downward direction, in a manner well known to the art. Spindle 23, which slides within said hollow spindle 6, at its lower end engages said jaws 22 in such manner that said jaws can be moved either up or down by said spindle 23. A spring (not shown) tends to keep said spindle 23 at its upward limit of travel, and thus the jaws 22 of the chuck in a gripping position. On either side of spindle 6 near its upper end are pins 24 which engage with the slots 25 in the forked end of lever 26. Said lever 26, which is pivotally supported by the arm 3 near its midpoint, at its other end carries the pin 27 which in turn engages the slot 28 in arm 29. Said arm 29 is pivotally supported at its other end by the arm 3, and at its point of pivot is connected to the handle lever 30 which thus serves to raise and lower the chuck 21. At its upper end hollow spindle 6 carries a bracket 31 to which is pivoted one end of the lever 32, which is so positioned as to rest upon the upper end of spindle 23. Means for depressing said lever 32, and thereby opening the jaws 22 of the chuck 21, is provided in the handle lever 33 which is pivotally supported by handle lever 30 near the lower end thereof, at a point convenient for the simultaneous operation of said handle lever 30 and 33. A chain 34 connects the end of lever 32 with an arm of the handle lever 33, being guided therebetween by pulleys 35 and 36 mounted on lever 26 and pulley 37 which is supported on an arm 38 extending from the upper end of handle lever 30. Arm 39, which is attached at one end to lever 26 at a point back of its pivot, at the other end carries the weight 40 which counterbalances the weight of the chuck mechanism.

Rotational movement is imparted to burners 16 by means of pulley 8 which is in turn actuated through the belt 41, passing over pulleys 42, mounted on a rearward extension of arm 3, and driven by pulley 43 on counter shaft 44 which is journaled on the table 1. Said shaft 43 is in turn driven by the pulley 45 which connects therewith through the clutch members 46 and 47, said pulley 45 being actuated through belt 48 by a suitable motive source not shown. The clutch member 46, which is slidably keyed to the shaft 44, is moved into and out of engagement with the cooperating clutch member 47 by means of the bell crank 49, connected by extensible rod 50 to a suitable actuating means such as a pedal not shown. The rod 50 also connects to the operating lever 51 of a gas and air mixing valve 52. Such valves being well known in the art, further description is deemed unnecessary. Gas and air are fed to said valve 52 from suitable sources by the tubes 53 and 54 respectively, and a proper mixture thereof passes into tube 14 and thus to burners whenever the rod 50 is depressed. The valve 52, is, however, so adjusted as to allow passage of sufficient gas to maintain a pilot flame even when the valve is in a closed position. It will thus be seen that whenever the flame from burners 16 is raised rotation thereof will be simultaneously started. The heat will thereby be properly distributed, minimizing losses of tubing from cracking due to uneven heating. A spring 55 tends to keep said rod 50 raised, and thereby the clutch members 46, 47 separated and the valve 52 closed.

In front of the standard 2 table 1 also supports the standard 60 which at its upper end carries the block 61, which is for convenience located at a considerable angle to the front of the table 1. The upper side of the block 61 is grooved to accommodate the block 62 which is slidable therein, slideways being provided in the block 61 to cooperate with projecting edges on the block 62. Attached to the lower side of the block 62 is a rack 63 which cooperates with the pinion 64 to produce longitudinal movement of block 62 in block 61. Said pinion 64 is mounted on a shaft 65 which is journaled on the lower side of the block 61, and is operated by the handwheel 66 mounted on the front end of said shaft 65. A bracket 67 is attached to the top of block 62 near one end thereof. A bar 68 is attached to the bracket 67 and at an angle thereto, either rigidly as in Figs. 1 and 2, or adjustably as in Fig. 4, where clamping screws 69 and arcuate slots 70 in the bracket 67 allow of angular adjustment of the bar 68. Transverse bars 71 are mounted on the bar 68 having depressions 72 and 73 therein on opposite sides of the bar 68 to hold pieces of glass tubing. The depressions 72 are shaped to conform somewhat to the wall of the tube in order to accurately center the tubing therein. The depressions 73 are merely slotted out of the bar, since it is desirable to allow for a slight variation of the position of the tubing in these depressions. In the bottom of the slots 73 are the plungers 74 which pass through the bottom of the bars 71 and abut against the spring members 75 which are attached to the opposite side of said bars 71, said plungers thus yieldably supporting glass tubing when inserted therein. The clamping bar 76 on the spindle 77 is rotatably carried by the bar 68. A compression spring on the spindle 77 behind the bar 68 (not shown) transmits to the bar 76 the desired clamping tension. Said clamping bar 76 can be rotated by means of the handle 78 from the clamping position shown to a position at right angles thereto, for the removal or insertion of tubing in the depressions 72 and 73. In Fig. 4 an extension 79 is provided for the bar 68. At the end of the bar 68 (Fig. 2) or of the extension 79 (Fig. 4) is a cross arm 80, which is adjustably secured in the latter figure. At its lower end the cross arm 80 is bent forward to hold the cup 81, the opening in which is substantially closed by the disc 82 which is forced against its outward limit by the spring 83. On the exposed face of the disc 82 there is mounted the cylindrical sleeve 84 within which are several disc shaped pieces 85 of cushioning material such as asbestos which serve to make a substantially air tight joint with the end of a glass tube placed against them. In Fig. 2 a means of transmitting air to such a piece of tubing is shown in the nozzle 86 which passes through the center of cup 81, disc 82, and the asbestos pads. Air under pressure is supplied by tube 87 from any suitable source to a central passage not shown in the handle lever 30, from which it passes to the nozzle 86 in certain cases, and directly to the glass tubing in others, by the tube 88. A by-pass 89, which may be closed to varying degrees by application of a finger by the operator, serves to regulate the air pressure within the tubing. The opposite end of a piece of glass tubing 90 held by the supporting means illustrated, if shaped as in Fig. 1, is closed by a rubber stopper 91. All of the surfaces of these supporting means which come in contact with the glass tubing are preferably covered with hard asbestos or other suitable heat insulation.

In completing the bend A in Fig. 5 the tubing 92 would be held in a supporting means such as illustrated in Fig. 2, but the tubing 88 would be connected to the tubulation 93, the arm 80 with its associated apparatus being removed from the bar 68 if desired, since it is unnecessary in this operation. In forming the bend B in the tubing 94 before the bend C has been completed the supporting means of Fig. 4 may be used, the tube 88 being applied to one of the open ends of the tube by means of an annular plug and the stopper 91 to the other. In next forming the bend C it is obvious that the tubing would be merely reversed in the holding means, the arm 80 then being unnecessary. A positioning guide for the tubing may be provided by turning up the end of the bar 79 as at 95 in Fig. 4.

In the use and operation of the apparatus heretofore described two pieces of tubing which have been previously joined as at A in Fig. 5, and which may range from the simple shape shown in Fig. 1, to far more complicated configurations are placed in the supporting means with the longer member resting in the depressions 72 and a parallel section, if any, in the depressions 73, with an open end, if any, of the transverse section of tubing resting against the asbestos pad 85, the tubing being clamped in position by means of the bar 76, operated by the handle 78. This tubing is preferably preheated before putting in this machine. Air connection is provided to the tubing by means of the tube 88 in any suitable manner, depending upon the configuration of the tubing, as previously described. By operation of the handle lever 33 the jaws 22 of the chuck 21 are opened and a short piece of glass tubing 96 of any convenient size is introduced therein. The motor being running, the flames from the burners 16 are raised and started rotating by depressing the rod 50, as by a pedal, not shown. The tubing, 90 for instance, is then moved by operation of the handwheel 66 so as to bring the junction of the two legs thereof directly under the tube 96. The flames are then briefly played over the junction of the tubing by means of the handle lever 20 to raise its temperature somewhat to equalize stresses preparatory to further heating. The burners 16 are then raised by the handle lever 20 to cause the flames to play upon the tubing 96, softening said tubing, after which said tubing 96 is lowered by means of the handle lever 30 almost into contact with the open projecting end 97 of the tubing 90 which is to be pulled off, the flames following. At this point the projecting tip 97 will also be softened by the flames, after which the tubing 96 is further lowered and fused to said projecting tip 97. The flames are then lowered by means of the handle 20 to the point at which it is desired to close the bend. As the glass softens at this point the surplus glass 97 is pulled off by raising the tubing 96 through operation of the handle 30, the glass of the tubing 90 closing in behind, as is well known in the art. The glass at the bend is then worked by moving the flames through the handle lever 20, by moving the tubing by means of handwheel 66, and by varying the air pressure by partially closing the by-pass 89 until the desired smooth bend has been produced, such working of glass being well understood by those skilled in the art. The rotation of the burners is then stopped and the flames reduced to a pilot only by release of the pedal (not shown) after which the clamping bar 76 is removed by turning handle 78, and the tubing 90 removed. The chuck 21 is also opened by means of the handle lever 33 and the scrap material removed, after which the machine is ready to go through the above operations again on a fresh piece of tubing 90.

It is to be understood that in forming the more complicated configurations such as shown in Fig. 5 the step performed by this machine must alternate with the earlier step of joining the tubing together, either by hand or by machine, since the bend being worked by this machine must always be an outside corner.

While I have shown and described in detail one embodiment of my invention and have pointed out in the claims certain novel features thereof, it is obvious that various omissions, substitutions and changes in the form, parts and details of the device illustrated and in its operation may be made by those skilled in the art without departing from the spirit of the invention.

I claim:

1. In glass working machinery, means for holding each of two pieces of glass tubing at an angle to the horizontal, the end of one of said pieces of tubing being fused into the side of the other near the end thereof, means for varying the air pressure within said tubing, means for applying a fusing heat to the junction of said pieces of tubing comprising rotating gas jets, means for varying the position of said jets with respect to said tubing both vertically and horizontally, and means for removing the protruding end of said second tube to leave a smooth bend at said junction, comprising means for moving a piece of glass into contact with said end while said end is heated and then withdrawing said piece of glass after it has fused with said end and after said junction of said tubing has been fused.

2. In glass working machinery, means for holding each of two pieces of glass tubing at an angle to the horizontal, the end of one of said pieces of tubing being fused into the side of the other near the end thereof, means for varying the air pressure within said tubing, means for applying a fusing heat to the junction of said pieces of tubing comprising rotating gas jets, means for simultaneously starting rotation of said jets and supplying gas thereto, and means for removing the protruding end of said second tube to leave a smooth bend at said junction.

Signed at Hoboken in the county of Hudson and State of New Jersey this 26th day of December, A. D. 1928.

GEORGE A. MILLAR.